May 29, 1923.
M. VAN MARLE
1,456,837
APPARATUS FOR CHARGING OR DISCHARGING FURNACES
Filed June 16, 1921  3 Sheets-Sheet 1
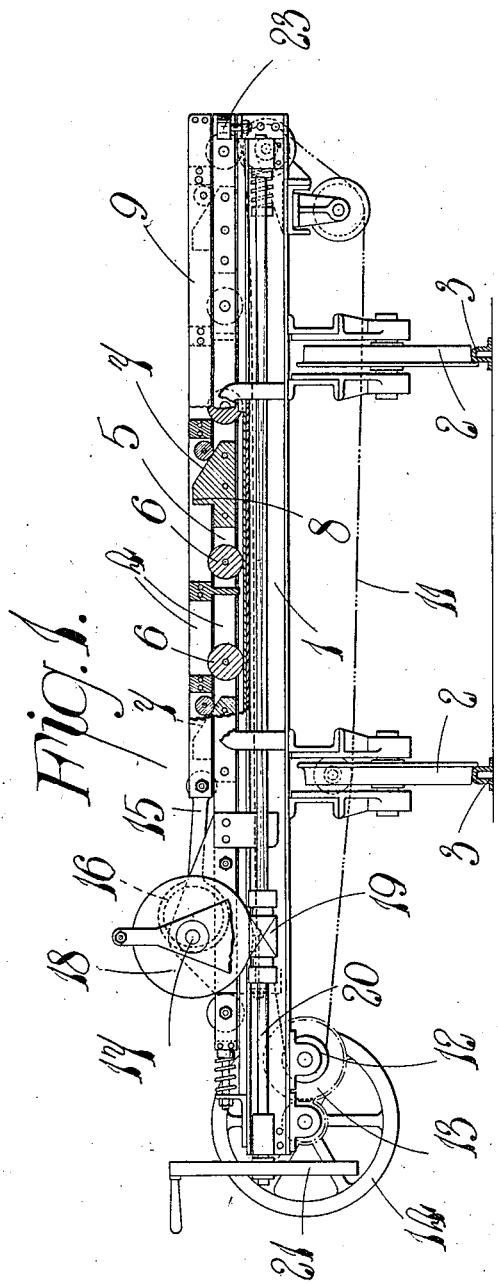
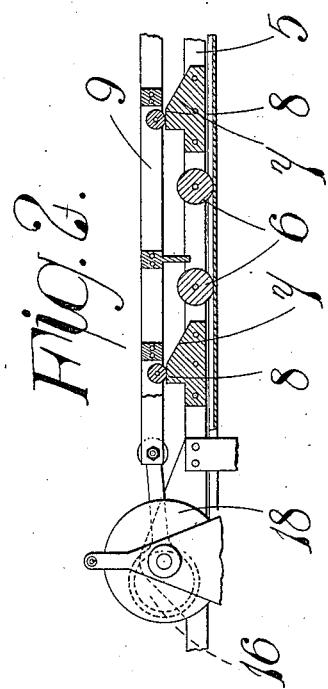

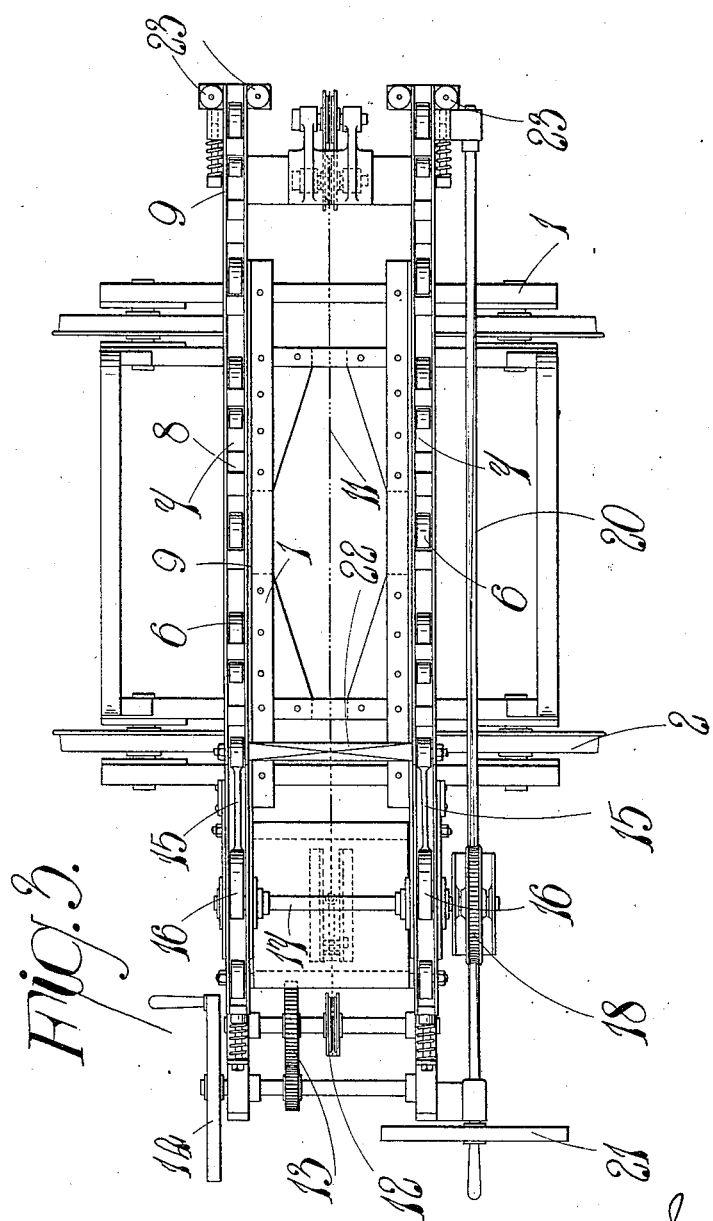

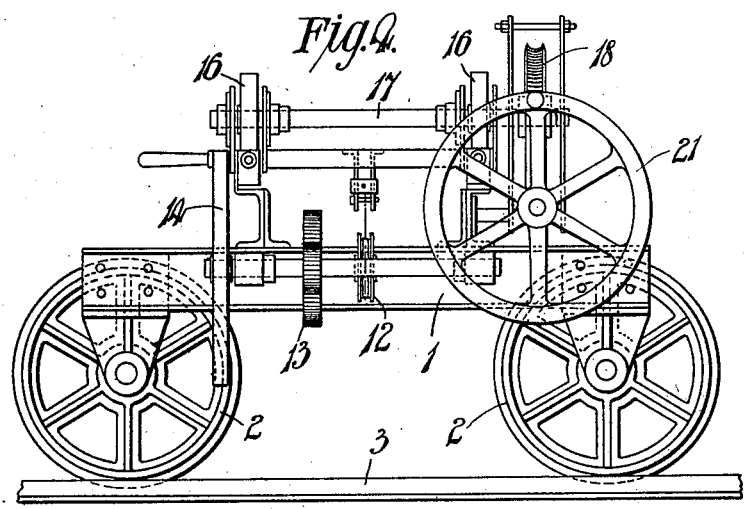
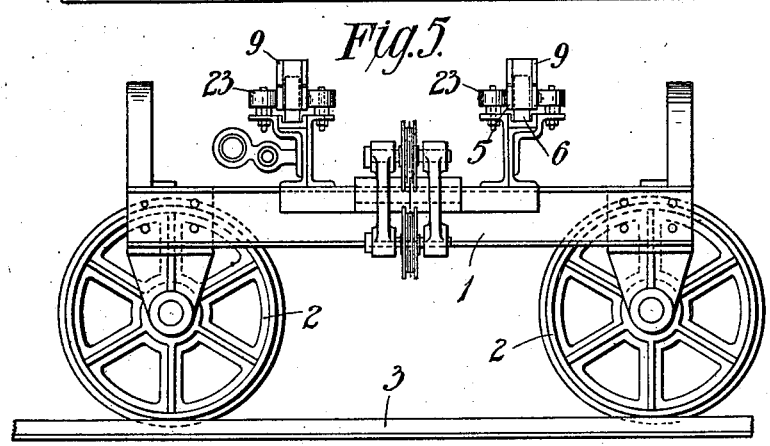

Patented May 29, 1923.

1,456,837

UNITED STATES PATENT OFFICE.

MARTIN VAN MARLE, OF LOWER GORNAL, ENGLAND.

APPARATUS FOR CHARGING OR DISCHARGING FURNACES.

Application filed June 16, 1921. Serial No. 478,123.

*To all whom it may concern:*

Be it known that I, MARTIN VAN MARLE, a subject of the King of Great Britain, residing at Dibdale Works, Lower Gornal, in the county of Stafford, England, have invented a certain new or Improved Apparatus for Charging or Discharging Furnaces; and I do hereby declare the following to be a full, clear, and exact description of the same.

This invention relates to means for feeding goods into and removing goods from annealing and other furnaces, and includes means in that type of apparatus which has an undercarriage on which is mounted an upper travelling carriage formed in two parts. Such apparatus is described in my prior specification, Patent No. 1,402,551, of Jan. 3, 1922.

In my said prior invention I employ on a goods carriage longitudinally disposed goods carrying bars combined with means for raising and lowering such bars on said goods carriage for the purpose of feeding goods into and removing goods from annealing and other furnaces. My present invention comprises improved means for imparting endwise movements to the goods carrying bars on the goods carriage and improved means for so supporting the goods carrying bars on the carriage that the longitudinal movement of the goods carrying bars in the one or the other direction causes the goods carrying bars to rise or fall on the carriage.

According to my present invention I employ at certain intervals apart on the carriage (or on the goods carrying bars) inclined blocks combined with rollers on the goods carrying bars (or on the carriage) the inclined surfaces of the said blocks terminating in substantially horizontal parts so that as the goods carrying bars are moved endwise in one direction the rollers on the goods carrying bars roll up the inclined blocks on the carriage, thereby raising the goods carrying bars until the rollers arrive on the top flat faces of the inclines, or the inclined blocks on the goods carrying bars move along the rollers on the goods carriage until the flat end lower parts of the inclines arrive on the tops of the rollers, and thus the goods carrying bars and the goods thereon are raised. The goods carrying bars are combined with suitable means for moving them longitudinally in one or the other direction. Thus, by employing the said combined rollers and inclined blocks, the moving and the rising and lowering of the goods carrying bars is facilitated and when the rollers arrive at the horizontal parts of the inclines as when the goods carrying bars are in their highest position there is no tendency for the goods carrying bars to run back.

Another part of my invention relates to an improved means for imparting endwise movement to the goods carrying bars. According to this part of my invention I provide a transverse shaft on the carriage and a pair of eccentrics or their equivalents on this shaft and eccentric rods or their equivalents connecting the eccentrics or the like one with each bar, means also being provided for giving a rotary motion to the transverse shaft.

Referring to the drawings:—

Figure 1 is a view in side elevation partly in section shewing the improved means for raising and lowering the goods carrying bars.

Figure 2 is a view in side elevation partly in section shewing the goods carrying bars in their upper position.

Figure 3 is a plan view.

Figure 4 is an end view.

Figure 5 is an end view taken from the opposite end to that shewn in Figure 4.

In the construction illustrated the general arrangement of the machine is similar to that described in my prior patent referred to, there being an undercarriage 1 mounted upon wheels 2 which run on rails 3, it being understood that the rails 3 are parallel to the row of furnace doors.

The undercarriage 1 serves as a support for a travelling carriage which may be designated as a whole 4. This travelling carriage 4 comprises a lower member 5 having rollers 6 by which the travelling carriage can move along guides upon the undercarriage 1.

The member 5 is provided with a suitable number of inclines 7, the upper ends of which terminate in horizontal surfaces 8.

The upper members 9 of the travelling carriage constitute the goods carrying bars and these members 9 are provided with a number of rollers which co-operate with the inclines 7 and the surfaces 8, the movement being such that when the members 9 are moved in an endwise direction relatively to the member 5, the members 9 are either raised or lowered.

As in the machine described in my prior patent referred to, the carriage 4 can as a whole be moved in an endwise direction by gearing which includes a chain 11 passing over a pulley 12 driven by gearing 13 operated by a handle 14 or in any other suitable manner.

In order to simplify the mechanism for imparting the necessary longitudinal movements to the goods carrying bars 9 when raising or lowering the same, the goods carrying bars 9 are connected by two eccentric rods or the like 15 on to two eccentrics 16 or the like on a cross shaft 17 carried by the goods carriage 4 and on this shaft 17 there is a worm wheel 18 gearing with a worm 19 mounted so that it is caused to turn with but allowed to slide along a longitudinal square or other shaft 20 at the side of the carriage furnished with turning means 21 at its back end so that by turning this shaft and the worm and worm wheel gearing therewith and eccentrics the necessary longitudinal movement in the one or the other direction will through the eccentric rods or the like be imparted to the goods carrying bars which at or near their back ends are tied together at 22 as are the side bars of the carriage 5 but at the front ends the side bars of the carriage pass between guide rollers 23 mounted on brackets on the undercarriage, these guide rollers 23 thus preventing lateral displacement of the side bars 5 of the carriage as it goes into or out of the furnace.

What I claim then is:—

1. Apparatus for feeding goods into or removing goods from furnaces, comprising an undercarriage, an upper travelling carriage movably mounted thereon, said upper carriage including a supporting element and an independent goods carrying element resting thereon, inclined blocks on one of said elements having each an inclined face and a substantially horizontal face, abutments on the other of said elements, means carried by said undercarriage for moving said upper travelling carriage as a whole with respect to the undercarriage and means carried by said upper travelling carriage for moving one of said elements with respect to the other of said elements irrespective of movement of the undercarriage, whereby said inclined blocks co-act with said abutments to alter the level of the goods carrying element.

2. Apparatus for feeding goods into or removing goods from furnaces, comprising an undercarriage, an upper travelling carriage movably mounted thereon, said upper carriage including a supporting element and an independent goods carrying element resting thereon, inclined blocks on one of said elements having each an inclined face and a substantially horizontal face, abutments on the other of said elements, means carried by said undercarriage for moving said upper travelling carriage as a whole with respect to the undercarriage, means carried by said upper travelling carriage for moving one of said elements with respect to the other of said elements irrespective of movement of the undercarriage, and means carried by said undercarriage for operating the means for moving one of the upper travelling elements whereby said inclined blocks co-act with said abutments to alter the level of the goods carrying element.

3. Apparatus for feeding goods into or removing goods from furnaces comprising an undercarriage, an upper travelling carriage movably mounted thereon, said upper carriage including a supporting element and an independent goods carrying element resting thereon, inclined blocks on one of said elements co-operating with abutments on the other of said elements, said inclined blocks having each an inclined face and a substantially horizontal face, means for moving said upper travelling carriage as a whole with respect to the undercarriage, means for moving one of said elements with respect to the other of said elements, said means comprising a travelling shaft on the upper travelling carriage, a pair of eccentrics on said shaft, and rods connecting said eccentrics with one of said elements and means for imparting rotary motion to the transverse shaft.

4. Apparatus for feeding goods into or removing goods from furnaces comprising an undercarriage, an upper travelling carriage movably mounted thereon, said upper carriage including a supporting element and an independent goods carrying element resting thereon, inclined blocks on one of said elements co-operating with abutments on the other of said elements, said inclined blocks having each an inclined face and a substantially horizontal face, means for moving said upper travelling carriage as a whole with respect to the undercarriage and means for moving one of said elements, with respect to the other of said elements, said means comprising a transverse shaft on the upper travelling carriage, a pair of eccentrics on said shaft and rods connecting said eccentrics with one of said elements and worm gearing for imparting rotary motion to the transverse shaft, whereby said inclined blocks co-act with said abutments to alter the level of the goods carrying element.

In witness whereof I affix my signature.

M. VAN MARLE.